United States Patent

[11] 3,627,952

[72] Inventor Jean-Michel Person
rue du Parc Saint Jacques, Perros-Guirec, 22, France

[21] Appl. No. 17,761
[22] Filed Mar. 9, 1970
[45] Patented Dec. 14, 1971
[32] Priority Mar. 12, 1969
[33] France
[31] 69-06864

[54] DIRECT CURRENT REDUCTION NETWORK FOR AMPLIFICATION TELEPHONE SETS
3 Claims, 5 Drawing Figs.

[52] U.S. Cl. .......... 179/16 F, 179/81 B
[51] Int. Cl. .......... H04m 1/76
[50] Field of Search .......... 179/16 E, 16 F, 1 A, 1 C, 16 A, 16 B, 18 AH, 18 FA, 18 F, 18 FC, 81 R, 81 B

[56] References Cited

UNITED STATES PATENTS

| | | | |
|---|---|---|---|
| 3,321,583 | 5/1967 | Maul | 179/18 FA |
| 3,393,274 | 7/1968 | Ingraham | 179/16 F |
| 2,977,420 | 3/1961 | Lowry | 179/18 FA |
| 3,551,754 | 12/1970 | Shaffer | 179/18 FA |

*Primary Examiner*—Kathleen H. Claffy
*Assistant Examiner*—Randall P. Myers
*Attorney*—Abraham A. Saffitz

ABSTRACT: Direct-current reduction network which shunts a part of the supply current of a subscriber's telephone set having a microphone current amplifier in order to have on the exchange side a large direct-current capable of acting on the loop detection system of the exchange and on the telephone set side a smaller current. It comprises two equal resistors inserted in one and the other of the subscriber's line wires respectively, two transistors having their base-emitter paths respectively connected to the terminals of one and the other of said resistors, a shunt resistor or two terminal-network passing the direct-current and connected between the collectors of the transistors and two diodes respectively connected in their passing direction between the emitters and collector of one or the other of the transistors.

Fig. 1
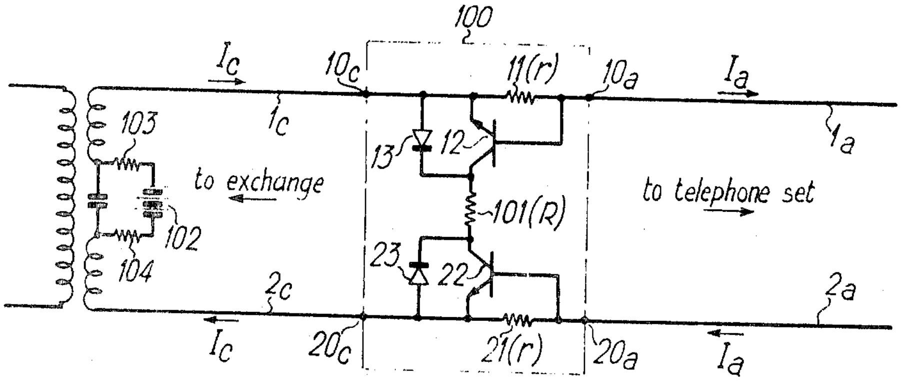
Fig. 3
Fig. 2
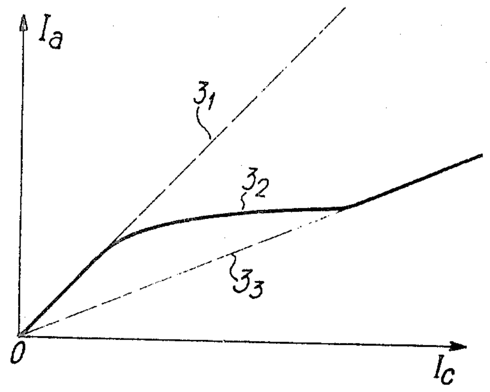
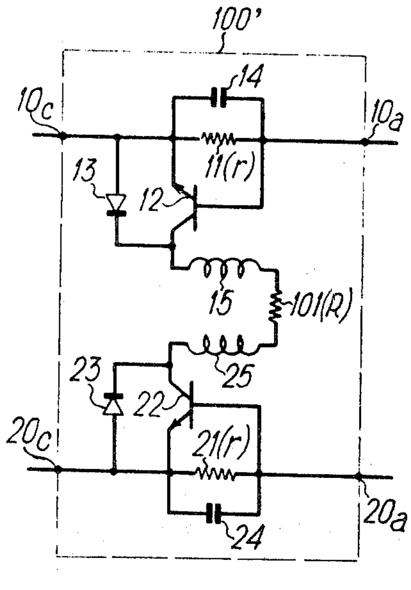
INVENTOR:
JEAN-MICHEL PERSON
By: Abraham A. Saffitz
ATTORNEY INVENTOR:
JEAN-MICHEL PERSON
By: Abraham A. Saffitz
ATTORNEY

DIRECT CURRENT REDUCTION NETWORK FOR AMPLIFICATION TELEPHONE SETS

The present invention concerns a four terminal network inserted between a subscriber's telephone set comprising one or two amplifiers and the exchange with which this set is connected to reduce the intensity of the current supplying this set.

As is well known, a subscriber's telephone set with a microphone amplifier and an earphone amplifier makes it possible to compensate the attenuation in the line connecting it to the exchange as a result of the gain of these amplifiers.

Amplification telephone sets require a supply voltage at their terminals that is higher and supply current which is lower than in the case of telephone sets without amplification, that is to say carbon granule microphone sets, 7 to 12 v., therefore an average of 10 v. instead of 3 v. where the voltage is concerned and 10 ma. instead of 25 to 35 ma., that is to say an average of 30 ma. where the current is concerned, these figures being given to gain an idea.

Starting with a power supply battery of given electromotive force, 48 v. as is usual, the voltage drop that can be allocated to the subscriber line attenuation is of the same order for the two types of subscriber sets with or without amplification, that is to say approximately 40 v., where the supply currents have a ratio of 1 to 3. Amplification telephone sets, therefore, tolerate longer connection lines than sets without amplification.

However, this advantage cannot be applied when the amplification telephone sets are connected to an electromechanical exchange designed for sets without amplification. In actual fact, amplification sets only require a supply current of 10 ma. whereas in an exchange of the type under consideration, a current of the order of 30 ma. is necessary to give sufficient voltage at the terminals of the battery supply bridge, which voltage serves to detect the loop conditions.

The object of the invention is, therefore, to insert between the subscriber equipment in the electromechanical exchange and the amplification subscriber's set, a direct current reduction network installed in the exchange or at a point along the subscriber's line and making it possible to derive a predetermined current from the subscriber's line for the current between the exchange and the said network to be of the order of 30 ma. and the current between the said network and the subscriber's set to be of the order of 10 ma.

The direct-current reduction network of the invention consists of two resistors of equal values respectively inserted in the two wires of the subscriber's line and at the ends of which are respectively connected the emitter and the base of a transistor. The emitters of these two identical transistors, are connected to the ends of resistors which are on the exchange side and the bases are connected to the ends of the resistors on the subscriber set side. The collectors are connected to a resistor of appropriate value and a diode is connected between the emitter and the collector of each transistor with its passing direction being from the emitter towards the collector.

The two transistors in the network operate in the blocked and saturated states; they have no special amplification characteristics to fulfill.

The operation of the network of the invention is the following. When the subscriber's loop is open, the transistors are blocked and they cannot be unblocked for as long as no current passes through this loop. When a current passes through the subscriber's loop, the transistors remain blocked until this current attains a certain value after which unblocking of one transistor occurs. The current then passes in the path comprising the unblocked transistor, the resistor which connects the collectors of the two transistors and the diode shunting the blocked transistor as well as the subscriber set which is then shunted by the said resistor.

The attenuator network only produces an additional voltage drop of approximately 1 v. in the link. The telephone currents are subjected to an attenuation of less than 1 db. Such an attenuation can easily be taken up by the telephone set with the amplifiers that it contains. As will be seen hereinafter, this attenuation can even be totally suppressed by suitably installing inductances and capacitors in the network.

A special feature of the current reduction network is that, as a result of the symmetry of its assembly, its operation does not depend on a given current direction along the subscriber line; it therefore transmits the battery inversion signal. Furthermore, since the current reduction network has no inherent time constant linked with the use of reactive components, switching signals (receiver lifting, numbering with dial or multifrequency, bell) are perfectly transmitted.

In the current reduction network that has just been defined, the shunt obtained in the direct current is a resistor passing direct current in one direction and then in the other before and after battery inversion. In another embodiment, the shunt is a two terminal network or unidirectional dipole connected between a junction point between two diodes mounted in opposite direction and respectively connected to the line wires at the end of the serial resistors on the exchange side and the junction point of two assemblies each consisting of a transistor in series with a diode and respectively connected to the line wires also at the end of the serial resistors on the exchange side, the transistors being controlled as in the first embodiment.

To prevent one of the resistors in series on the line from consuming purely lost current, whereas the other resistor is shunted by the deblocked transistor emitter-base space, diodes are placed across the terminals of these resistors.

The fact that the two-terminal network forming the shunt is constantly passing current in the same direction results in the possibility of including active semiconductor components with characteristics linked to the direction of the current. These components can be linear or not; they can also form a negative impedance network. When the two-terminal network is passive, it can either be a filter of any other frequency equalization system.

The invention shall now be described in detail in relation with the attached drawing in which:

FIG. 1 illustrates the electrical diagram of a direct-current reduction network in conformity with the invention;

FIG. 2 is a diagram showing the establishment of direct-current in a subscriber's set preceded by a direct-current network;

FIG. 3 shows the reactive components that it is necessary to add to a direct-current reduction network so as not to attenuate call currents;

Figure 4:
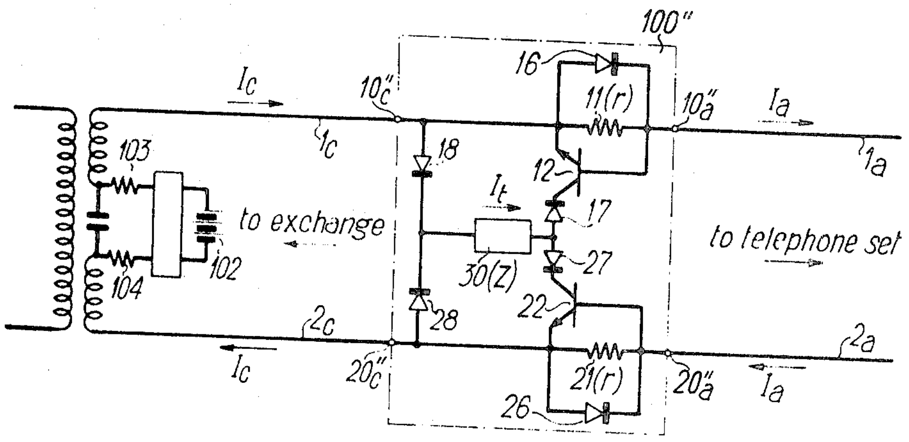
FIG. 4 illustrates another direct-current reduction network.
Figure 5:
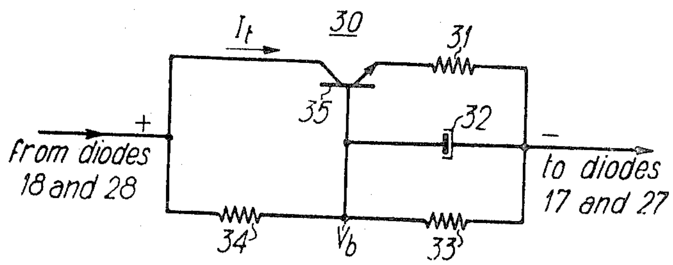
FIG. 5 is an example of a two-terminal network having higher impedance with alternating current than with direct-current.

By referring to FIG. 1, the current reduction network is a four-terminal network 100, the output terminals being $10_a$–20 and the input terminals $10_c$–$20_c$. This network is inserted into the subscriber line at the telephone exchange distribution frame. Its input terminals $10_c$–$20_c$ are connected to the subscriber's line, on exchange side, $1_c$–$2_c$ and output terminals $10_a$–$20_a$ are connected to the subscriber's line on the subscriber's telephone set side $1_a$–$2_a$.

Two resistors 11 and 21 with the same value *r* are inserted into the subscriber line. At terminals $10_a$ and $20_a$ are respectively connected the bases of two transistors 12, 22, of NPN-type for example, with identical electrical characteristics. At terminals $10_c$ and $20_c$ are respectively connected the emitters of transistors 12 and 22 and one of the electrodes of diodes 13 and 23, also of identical characteristics. The two other electrodes of these diodes are connected to the collectors of transistors 12 and 22. Finally, the collectors are connected to the terminals of a resistor 101 with a value R.

The connections of diode 13 and 23 are such that their passing direction leads from the emitter towards the collector of transistors 12 and 22. This results in no current being capable of passing through resistor 101 when the transistors are not unblocked.

When saturation occurs in at least one of these transistors, a current passes through resistor 101; this results in the current $I_c$, originating from the exchange is related to the current $I_u$ which emerges from the network to supply the telephone set in accordance with the equation:

$$I_c=\left(1+\frac{2r+R_T}{R}\right)I_a \quad (1)$$

with $R_T$ being the equivalent resistance formed by the subscriber line equipped with the telephone set.

When the subscriber's loop is open, no current passes through the network, therefore neither of transistors 12 and 22 is unblocked by a sufficient voltage across the terminals of one of these resistors 11 and 21. Since no current passes through resistor 101 as a result of the opposite passing direction of the diodes 13 and 23, the result is that no current passes through conductors $1_c$–$2_c$ linking the network with the exchange.

When a direct current passes through the subscriber's loop transistors 12 and 22 first remain blocked. Current $1_u$ which passes through the subscriber's set is equal to current $I_c$ delivered by the exchange:

$$I_u=I_c \quad (2)$$

as shown in FIG. 2 (straight line $3_1$).

As soon as the voltages across resistors 11 and 21 increase, transistors 12 and 22 start to unblock, resistor 101 passes current and current $1_u$ becomes less than current $1_c$. The variation of $I_u$ as a function of $I_c$ is represented approximately by curve $3_2$ (FIG. 2), which, tangentially leaving straight line $3_1$ tangentially reaches straight line $3_3$ defined by equation (1) hereabove, as soon as transistors 12 and 22 are completely saturated. The current, delivered by the exchange is then the sum of the subscriber's loop current and the current passing through resistor 101.

A current reduction network in conformity with the invention that gave satisfaction had the specifications given hereafter:

Resistors 11 and 21 : $r$=82 ohms
Resistor 101 : $R$=2,700 ohms
Transistors 12 and 22 : NPN-type BF 186 (voltage between base and emitter for unblocking ≅0.7 volt.
Diodes 13 and 23 : type 11 Z 6

For an exchange battery 102 with an electromotive force of 48 v. and a power supply bridge consisting of two 150-ohm resistors 103 and 104, the current $I_u$ in the subscriber set is equal to 10 ma. when the current $I_c$ is equal to 25 ma.

The circuit in FIG. 1 can be obtained in the form of an integrated circuit whilst, however, respecting certain conditions, as follows:

- resistor 101 must be capable of dissipating powers of the order of 0.5 to 1 watt,
- transistors 12 and 22, as well as diodes 13 and 23, must be capable of withstanding high voltages when they are subjected to inverse polarity. In actual fact when the call current is superimposed on the power supply voltage before the subscriber lifts his receiver, the voltage between the collector and emitter of one of the transistors can become more than 150 v.

FIG. 3 illustrates a current reduction network 100' including reactive components for the telephone currents not to be attenuated when passing through this network.

Resistors 11 and 12 are shunted by capacitors 14 and 24, for example of the order of 10 microfarads. Inductances 15 and 25 are connected in series with resistor 101; they must offer high impedances relative to those on the subscriber and exchange line.

FIG. 4 illustrates a network 100'' inserted into a subscriber's line the power supply system of which is the same as in FIG. 1. Network 100'' is a four-terminal network 10''$_u$, 20''$_u$ for the subscriber set side, which is not shown and to which it is linked by wires $1_u$–$2_u$ and 10''$_c$ and 20''$_c$ for the exchange side to which it is linked by wires $1_u$–$2_u$ and 10''$_c$ and 20''$_c$ for the exchange side to which it is linked by wires $1_c$–$2_{cu}$ and $10''_c$ on the one hand and 20''$_u$ and 20''$_c$ on the other hand are located the resistors 11 and 21 with a value $r$, at the terminals of which are connected the bases and emitters of NPN-transistors 12 and 22 as well as diodes 16 and 26. The collectors of these transistors are connected to diodes 17 and 27 mutually connected and at the common point of which is connected a two-terminal network connected, at its other side to the common point of two other diodes 18 and 28 respectively connected to the exchange side terminals 10''$_c$ and 20''$_c$.

In the example of FIG. 4, the current $I_c$ required by the loop condition detection system and delivered by battery 102 consists of a part $I_u$ absorbed by the set and a part $(I_c–I_u)$ derived through the current reduction system 100''. In the exchange and in this network, the current $(I_c–I_u)$ passes through resistor 103, line wire $I_c$, diode 18, network 30, diode 27, unblocked transistor 22, line wire $2_c$ and resistor 104.

The current $I_u$ required for operation of the subscriber's set follows the route comprising resistor 103, wire $I_c$, diode 16, wires $1_u$ and $2_u$, resistor 21, wire $2_c$, and resistor 104. In the case of current direction inversion, transistor 12 replaces transistor 22, diode 28, diode 18, diode 17, diode 27 and diode 26, diode 16 whereas resistor 11 fulfills the purpose of resistor 21. It should be noted that the direction of current $(I_c–I_u)$ remains invariable in two-terminal network 30.

The base current of the unblocked transistor can be neglected and it is possible to assume for a value of current $I_c$, the formula:

$$I_c=\left(1+\frac{r+R_T}{R}\right)I_a \quad (3)$$

which only differs from formula (1) by replacement of $2r$ by $r$, $R_T$ having the same significance as previously, with $R$ being the real part of the impedance Z of network 30.

When the loop is open, no current passes through it, none of transistors 12 or 22 of diode 18 and 28 is unblocked or passing and no difference distinguishes a line equipped with the network of the invention from an ordinary subscriber's line. If the current in this subscriber's line is too weak to unblock transistor 22, for example when this concerns inducted current due to parasite effects, the latter remains blocked and the loop detector remains insensitive to these current which are not subjected to the amplification given in formula (3).

Network 30 must, in the application under consideration, have low direct current resistance and high alternating current impedance. Such a network of the prior art is illustrated in FIG. 7.

It consists of a transistor 25 the emitter of which is connected to one of the terminals of the two-terminal network through an emitter resistor 31, the base of which is connected to the same terminal by a base resistor 33 and a capacitor 32 and to the other terminal by a base resistor 34, the collector being directly connected to this other terminal.

For alternating signals the impedance of the two-terminal network is approximately equal to the value of resistor 34 if assuming the capacitor 32 has a low impedance with respect to the value of resistor 33. For the direct current, the transistor is unblocked by voltage divider 33–34 and the resistance of the network is approximately equal to:

$$R_{31}\frac{R_{33}+R_{34}}{R_{33}}$$

This value is slightly higher than $R_{31}$; a much lower value than for $R_{34}$ will be selected for $R_{31}$.

Network 30, the main purpose of which is to attenuate the direct current on the subscriber's line, can subsidiarily serve to amplify the telephone signals. It then suffices to take for network 30 a negative impedance network. In this case the direct current attenuator network is preferably located at some point along the subscriber's line and not at the exchange side end of the line. The two-terminal network 30 can thus be fed by the direct current flowing in the line.

What I claim is:

1. Direct-current reduction network inserted in a subscriber's line serving a telephone set with at least one microphone current amplifier, connected to an electromechanical exchange where operation of the loop current detection system requires a direct current higher than that necessary for the supply of said telephone set, said network comprising first and second equal resistors respectively inserted in one and the other of the subscriber's line wires, first and second transistors the emitter-base paths of which are respectively connected across the terminal of said resistors; a first pair of diodes series mounted in opposite direction and connected between the collectors of said transistors and interconnected therebetween at a first common point, a second pair of diodes series mounted in opposite direction and connected between said line wires and interconnected therebetween at a second common point, and a two-terminal network having a low impedance for the direct current and a high impedance for alternating currents and having its first and second terminals respectively connected to said first and second common points.

2. Direct current reduction network according to claim 1 in which each one of said equal resistors inserted in the subscriber's line wires is shunted by a further diode.

3. Direct-current reduction network according to claim 1 in which said two terminal -network consists of a further transistor the emitter of which is connected to said first terminal of said network through an emitter resistor, while its base is connected to same said first terminal through the assembly of a further resistor and a capacitor in parallel connection and to said second terminal of said network through a still further resistor, and its collector is directly connected to latter said second terminal of said network, said emitter resistor having a resistance value much smaller than that of said still further resistor connecting latter said base to latter said second network terminal.

* * * * *